US009378650B2

(12) United States Patent
Kadar et al.

(10) Patent No.: US 9,378,650 B2
(45) Date of Patent: Jun. 28, 2016

(54) SYSTEM AND METHOD FOR PROVIDING SCALABLE EDUCATIONAL CONTENT

(76) Inventors: Naomi Kadar, Bedford, NY (US); Avraham Kadar, legal representative, Bedford, NY (US); Nadav Kadar, Bedford, NY (US); Vincent Thomas J. Rowe, Portland, ME (US); Avraham Kadar, Bedford, NY (US)

( * ) Notice: Subject to any disclaimer, the term of this patent is extended or adjusted under 35 U.S.C. 154(b) by 0 days.

(21) Appl. No.: 12/875,920

(22) Filed: Sep. 3, 2010

(65) Prior Publication Data
US 2011/0059423 A1 Mar. 10, 2011

Related U.S. Application Data

(60) Provisional application No. 61/239,943, filed on Sep. 4, 2009.

(51) Int. Cl.
*G09B 19/04* (2006.01)
*G09B 5/06* (2006.01)
*G09B 7/02* (2006.01)

(52) U.S. Cl.
CPC .. *G09B 5/06* (2013.01); *G09B 7/02* (2013.01); *G09B 19/04* (2013.01)

(58) Field of Classification Search
CPC .................................. G09B 19/06; G09B 5/04
USPC .......................................... 434/167, 185, 169
See application file for complete search history.

(56) References Cited

U.S. PATENT DOCUMENTS

| 5,393,236 | A | * | 2/1995 | Blackmer et al. | 434/169 |
|---|---|---|---|---|---|
| 5,857,173 | A | * | 1/1999 | Beard et al. | 704/276 |
| 5,865,626 | A | * | 2/1999 | Beattie et al. | 434/185 |
| 5,873,728 | A | * | 2/1999 | Jeong | 434/185 |
| 6,055,498 | A | * | 4/2000 | Neumeyer et al. | 704/246 |
| 6,077,085 | A | * | 6/2000 | Parry et al. | 434/322 |
| 6,226,611 | B1 | * | 5/2001 | Neumeyer et al. | 704/246 |
| 6,341,958 | B1 | * | 1/2002 | Zilberman | 434/157 |
| 7,149,690 | B2 | * | 12/2006 | August et al. | 704/270 |
| 2004/0023193 | A1 | * | 2/2004 | Wen et al. | 434/167 |
| 2004/0038187 | A1 | * | 2/2004 | Clark et al. | 434/172 |
| 2004/0076934 | A1 | * | 4/2004 | Wen et al. | 434/157 |
| 2005/0112531 | A1 | * | 5/2005 | Maldonado et al. | 434/157 |
| 2005/0255431 | A1 | * | 11/2005 | Baker | 434/169 |
| 2008/0033712 | A1 | * | 2/2008 | Yang et al. | 704/3 |
| 2008/0077388 | A1 | * | 3/2008 | Nash et al. | 704/3 |
| 2008/0160487 | A1 | * | 7/2008 | Fairfield et al. | 434/169 |
| 2009/0070111 | A1 | * | 3/2009 | Bajaj et al. | 704/251 |
| 2010/0081120 | A1 | * | 4/2010 | Nanjiani et al. | 434/322 |

* cited by examiner

*Primary Examiner* — Sam Yao
*Assistant Examiner* — Thomas Hong
(74) *Attorney, Agent, or Firm* — Pearl Cohen Zedek Latzer Baratz LLP

(57) ABSTRACT

Presented are a system and method for providing a graphical user interface (GUI) based modular platform having educational content. The method includes providing an interactive GUI on a computing device accessible by a user, receiving a first indication of a language being studied, displaying a GUI layer presenting a selection of level, unit, activity, and/or lesson, receiving a lesson selection, and computing a rating or score of the user's performance for the lesson. The system includes a control module, a language parser accessing content within repositories and providing language specific content, a syntax rule base providing language specific rules to the language parser, a lesson format base providing a lesson style to the control module, and a speech recognition system evaluating a user's utterance for pronunciation and sentence structure accuracy.

6 Claims, 8 Drawing Sheets

| Brain Pop | Word Lists | | |
|---|---|---|---|
| Level 1 | ✓ Unit Lists | Alphabetical List | Appendix |

| | | | | |
|---|---|---|---|---|
| Unit 1 | Unit 1 Lesson 1 | a<br>boy<br>fine<br>friend | girl<br>good<br>hi<br>how are you? | pretty<br>robot<br>tall<br>too |
| Unit 2 | | | | |
| Unit 3 | | | | |
| Unit 4 | Unit 1 Lesson 2 | flower<br>hat<br>no<br>not | OK<br>pen<br>sick<br>smell | telephone<br>Wait a minute!<br>What's wrong?<br>yes |
| Unit 5 | | | | |
| Unit 6 | | | | |
| | Unit 1 Lesson 3 | balloon<br>bird<br>but<br>in | magician<br>rabbit<br>cool/that's cool<br>the | trick<br>what<br>where<br>who |
| | Unit 1 Lesson 4 | and<br>behind<br>big<br>book | closet<br>desk<br>door<br>here | on<br>red<br>small<br>under |
| | Unit 1 Lesson 5 | again<br>be careful<br>drink<br>go | jump<br>lets's<br>look out!<br>practice | run<br>sit<br>stop<br>try |

FIG. 5

SYSTEM AND METHOD FOR PROVIDING SCALABLE EDUCATIONAL CONTENT

CROSS-REFERENCE TO RELATED APPLICATIONS

This application claims the benefit of priority, under 35 U.S.C. §119(e), of U.S. Provisional Application No. 61/239,943, filed Sep. 4, 2009, and titled "System and Method for Providing Scalable Educational Content," which is hereby incorporated by reference in its entirety.

FIELD OF THE INVENTION

The present invention relates to systems and methods for providing educational content and, in particular, to a system and method for providing language educational content from a modular platform.

BACKGROUND

In recent years, the availability of computers and network connections in the educational environment has increased. However, for learning language such systems currently fail to be used optimally. Moreover, the present systems are not scalable, or are inefficient to scale. There is therefore a need for an efficiently scalable system and method for providing educational content.

SUMMARY

In an embodiment of the invention, a method is provided for providing educational content pertaining to any of a plurality of languages over a network including receiving a language selection and a selection of an educational content unit, retrieving from a content database selected content items associated with the selected educational content unit, including at least one language-generic content item and at least one language-specific content item associated with the selected language, generating the educational content unit using the retrieved language-general and language-specific content items, and transmitting the generated educational content unit over the network for display on the computing device.

In an embodiment, the invention provides a system for providing a graphical user interface (GUI) based modular platform. The system includes a control module coupled to a bus, and configured to receive and provide data and control signals, a language parser coupled to the bus, and configured to access content within repositories and provide language specific content to the control module, a syntax rule base coupled to the bus and associated with the language parser, the syntax rule base configured to provide language specific rules to the language parser, a lesson format base coupled to the bus and configured to provide at least one lesson style to the control module, and a speech recognition system coupled to the bus and configured to receive an utterance from a user, wherein the utterance is evaluated with regard to at least one of pronunciation accuracy and sentence structure accuracy.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which:

FIG. 5 illustrates another layer of the embodiment of FIG. 2; and

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time.

Embodiments of the present invention relate to a modular platform that may provide games, lesson plans, activities and animated movies that may be used as an educational resource for teaching a language to a non-native speaker and/or reader of that language. A modular platform in accordance with an embodiment of the invention may be a comprehensive tool that can focus on reading, writing, vocabulary building, grammar and/or pronunciation skills.

Figure 1:
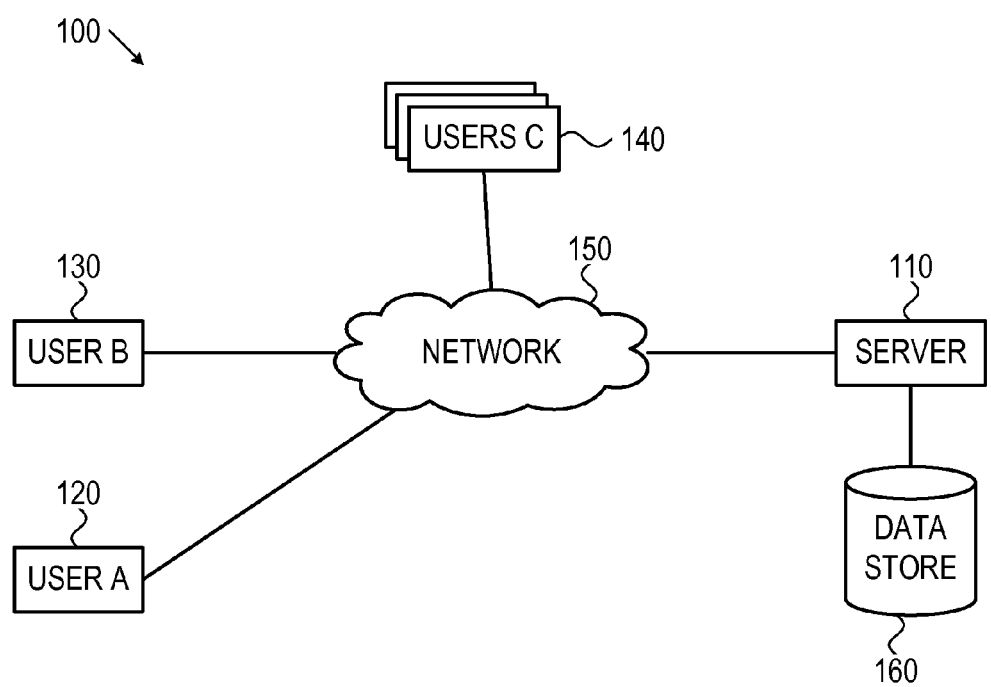
FIG. 1 illustrates an exemplary network system in accordance with an embodiment of the invention.

Reference is made to FIG. 1, showing a schematic view of an exemplary system 100 according to embodiments of the invention. System 100 may include a server 110, a user A 120, a user B 130, a plurality of users C 140, for example, collocated in a classroom environment, and a network 150 for communication therebetween. It will be understood that users A, B, and C need not be located in the same vicinity, but rather may each be remotely located from the others, wherein all are connected to a communication network, e.g., the Internet. For the sake of simplicity, computing devices operated by users A, B and C are not particularly shown, however, it will be recognized that users A, B and C as referred to herein denote a user operating any applicable computing device. For example, users A, B and C may operate a personal computer, a desktop computer, a mobile computer or phone, a laptop computer, a notebook computer, a terminal, a workstation, a server computer, a personal digital assistant (PDA) device, a tablet computer, a pad computer, a netbook computer, a network device, or any other suitable computing device. Server 110 may be any applicable server platform, e.g., one or more server computers or any one or more of the devices described herein with reference to devices that may be operated by user A. Server 110 may include hardware, software, firmware modules, or a combination thereof.

It will be recognized that embodiments of the invention are not limited by the type or nature of server 110, network 150, and/or devices operated by users A, B and C.

Network 150 may be, may comprise or may be part of, a private internet protocol (IP) network, the Internet, an integrated services digital network (ISDN), frame relay connections, modem connected to a phone line a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding and/or any other suitable communication means. It will be recognized that embodiments of the invention are not limited by the nature of network 150.

In some embodiments, server 110 may be a web server and may provide content, e.g., web pages, Adobe™ Flash files, Microsoft™ Silverlight files, and/or any other files that may be visually interpreted and interactively presented to users A, B and C. Accordingly, according to embodiments of the invention, users A, B, and C need not install application software on their computers, but rather, may interact with the system entirely over the Internet using generic browser software and suitable plug-ins, as required. Users A, B and C may interact with server 110 and/or with each other by interacting with content provided by server 110. An online application (not shown) on server 110 may allow users to login, for example, using usernames and passwords, which may be verified against a subscriber list, prior to providing educational content to users.

The content may be arranged hierarchically, for example, in a plurality of levels, each of which comprises a plurality of units, each of which, in turn, comprises a plurality of lessons. Thus, upon logging in, a user may be presented with a list of levels. Upon selecting a level, the user may be requested to select a unit, and within the unit, a list of lessons may be presented.

Figure 2:
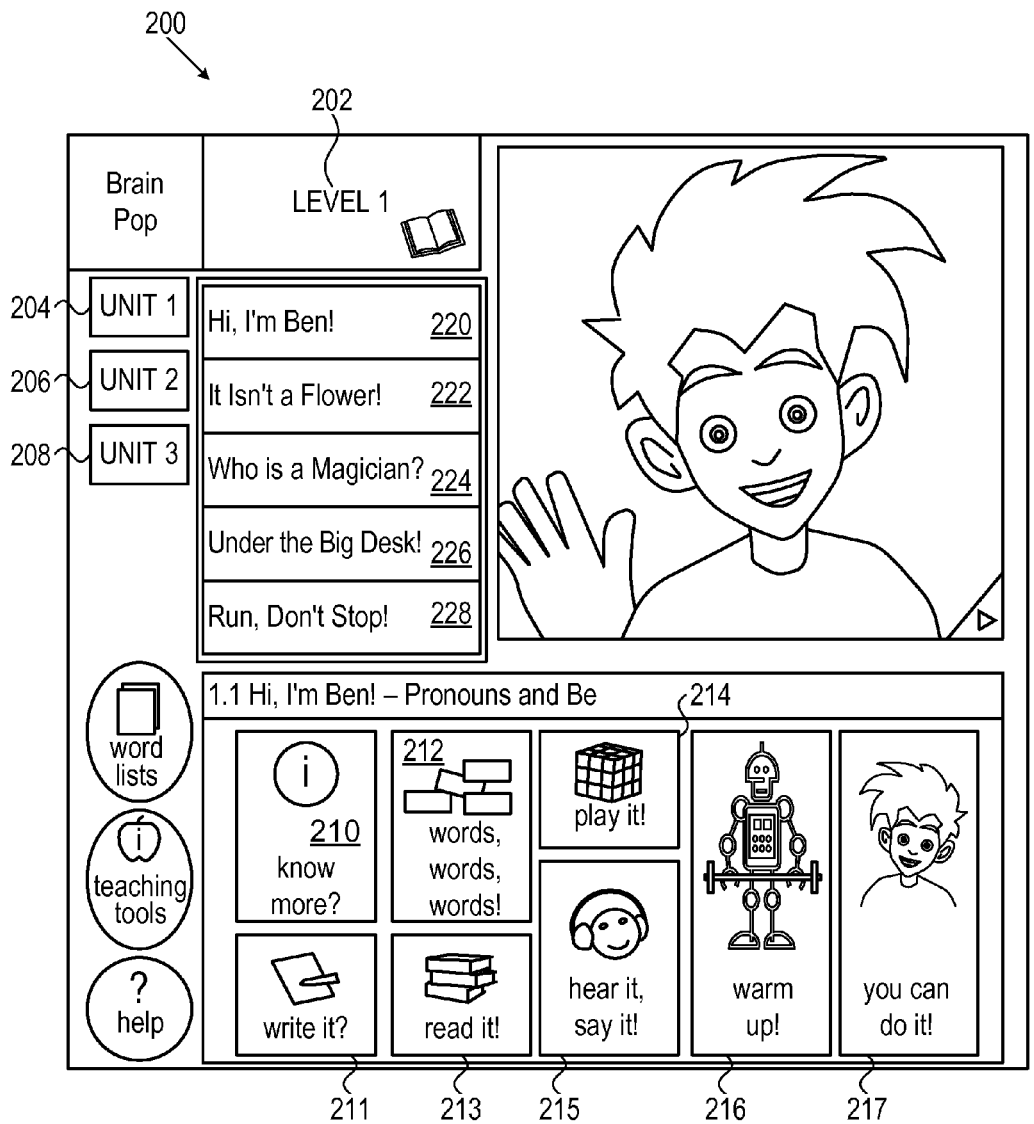
FIG. 2 illustrates a graphical user interface in accordance with an embodiment of the invention.

FIG. 2 illustrates graphical user interface (GUI) 200 in accordance with an embodiment of the present invention. The selected level 202 may be displayed (e.g., Level 1), the selected unit 204 (e.g., Unit 1) may be presented with a drop-down list of activities 220-228, other units 206, 208 for the lesson may be displayed as tabs, and lesson(s) 210-217 for the unit's selected activities may be displayed. Each of the levels, units, activities, and lessons may be a hyperlink that links the user to another page or layer in GUI 200. For any lesson selected, a video may be viewed that explains the lesson, for example, by clicking on the picture at the upper right portion of the screen. The positioning of the selected lesson, unit, and available lessons may be located at any position within GUI 200.

According to an embodiment of the invention, server 110 may provide GUI 200 over network 150 as a web page to the computing device operated by users A, B, and C. In accordance with another embodiment of the invention, the computing device operated by users A, B, and C may be a standalone device with a browser software application providing a GUI to enable interaction with content provided by server 110.

The lessons in accordance with an embodiment of the invention may include interactive features such as those displayed at the bottom of FIG. 2. Thus, for example, each lesson may include some or all common features with other lessons, including, for example, "Know More!", "Write It!", "Words, Words, Words", "Read It!", "Play It!", "Hear It, Say It!", "Warm Up!", and "You Can Do It!".

Lesson 210, "Know More!" may provide grammatical information on the unit. For example, in one embodiment of the invention, the use of a pronoun may be explained and various pronouns may be listed.

Lesson 211, "Write It!" may provide a printable worksheet form or a fillable portable document format (PDF). In one embodiment, the fillable PDF may be submitted via system 100 to the modular platform for analysis.

Figure 3:
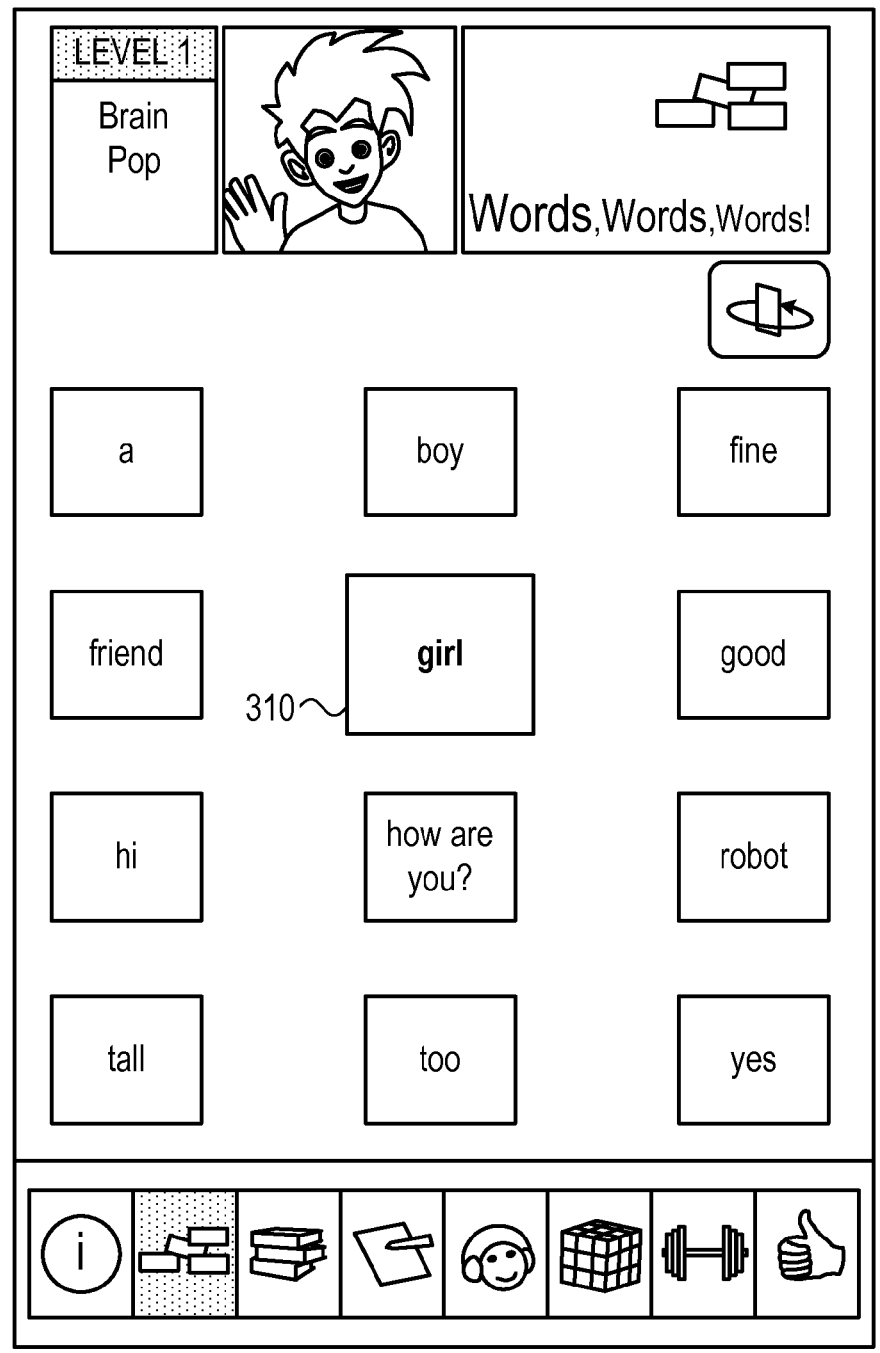
FIG. 3 illustrates a layer of the embodiment of FIG. 2.

Lesson 212, "Words, Words, Words!" may provide interactive flash cards displaying the lesson's words. FIG. 3 illustrates a web page 300 of GUI 200 in accordance with an embodiment of the invention. Webpage 300 is an exemplar of the destination when the link for lesson 212 is selected. When a mouse is scrolled over the interactive flashcards of webpage 300, the visual impact of the interactive flashcard may change, and/or an audio file of the word may be played. For example, interactive flashcard 310 is shown in an emphasized, enlarged state to alter its visual impact. The emphasis may be done in other ways as well. For example, the interactive flashcard may change color, begin to blink, be the sole interactive flashcard displayed while the mouse pointer is over it, etc. The audio file associated with the interactive flash card may play the word written on the card to solidify the written and spoken components of the language being taught—"girl" (English), "muchacha" (Spanish), "fille" (French), etc.

Lesson 213, "Read It!" may provide an interactive list of words with letter combinations highlighted within the words. Clicking on the word may cause an audio snippet to play with a pronunciation of the word, so that a user may learn how to pronounce the highlighted combination of letters. The "Read It!" feature may display letters, letter combinations, and/or words built from these letters. Words and letters may be entered dynamically, and letters may be automatically highlighted in each word, using a specialized search and replace function. Words and letters may be paired dynamically with audio that plays when clicking on an entry.

Figure 4:
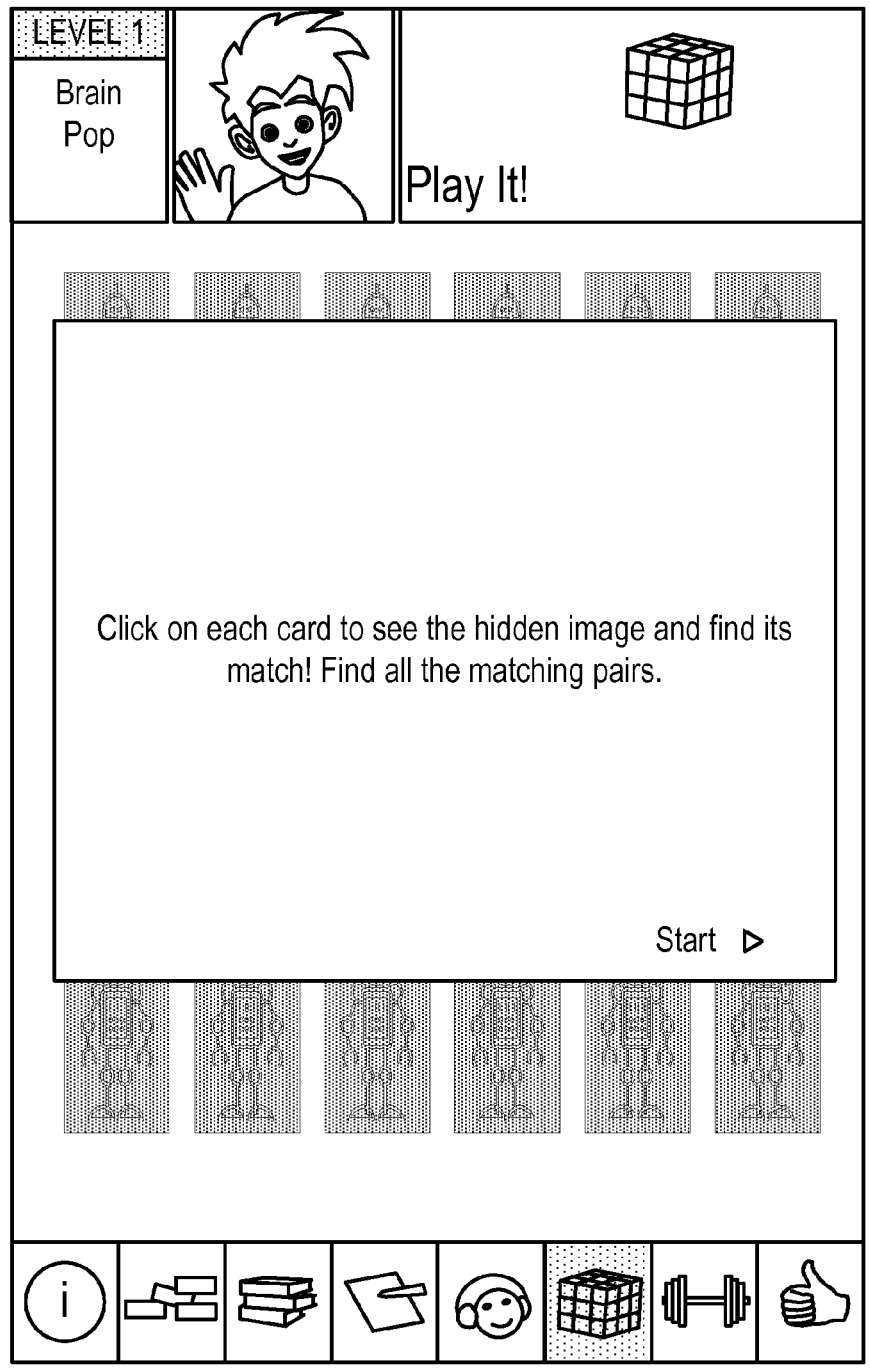
FIG. 4 illustrates another layer of the embodiment of FIG. 2.

Lesson 214, "Play It!" may provide an interactive screen that may display flash cards each with a hidden picture. FIG. 4 illustrates an interactive screen displaying the flash cards. By "turning over" a card (e.g., by clicking a mouse button or pointer), an image of a word may be presented to a user along with an audio snippet of the word's pronunciation. After the audio snippet plays, the image of the word disappears. By "turning over" other cards the user may be presented with a duplicate image and audio snippet. By sequentially "turning over" two cards with the same image and audio snippet, the cards may be removed from the screen's display.

Lesson 215, "Hear it, Say it!" may provide an interactive screen of images that can be selected by a user. For each image selected, a short video clip may be presented along with an audio snippet of a word, a string of words, or a sentence with content that may match the video clip. After hearing the audio snippet, a user may be encouraged to say the content of the audio snippet. The "Hear It Say It!" feature may load a file, or a series of files, for example, Shockwave Flash (.swf) files, which may be placed in a display menu at run time. When clicked, each of the movies may play in larger format, with prompts for user responses. It will be recognized that in order to be fully operable, such feature may benefit or require that a computer of user A, B, and/or C include a sound card and an audio device, e.g., a speaker.

In an embodiment in accordance with the invention, the computing device operated by at least some of users A, B, and C may include a microphone. The microphone may receive the user's utterance, which may then be converted to an audio file by the sound card. The audio file may be analyzed by a speech recognition system for grading to determine the clarity of the user's utterance. For example, the audio file may be transmitted back to the server 110, which may perform the analysis. As described further below, the analysis may include a comparison against one or more benchmarks or standards in order to provide feedback to the user. By receiving feedback on the user's speech pattern of the language being studied, and repeated practice of detected pronunciation problems of the user, the user's accent and/or pronunciation may be improved over time.

Lesson 216, "WarmUp!" may provide an interactive screen to reinforce the unit's lessons. For example, a Complete and Match warm up module may display text dynamically in boxes that may be dragged by the user to a corresponding matching text field. The text field may be a blank portion of a full sentence, from which a word has been removed programmatically. The removed word may be, for example, from the corresponding lesson of the unit. The text may then become a question, which in turn may be answered by dragging another set of dynamically created text fields.

In another "Warm Up!" module in accordance with an embodiment of the invention, a screen may display various images that may correspond to words from the unit's lessons. An audio snippet of a phrase, a string of words, or a sentence may be played. The user may be prompted to click on the image that may best match the prompt provided by the audio snippet. A visual and/or audio indication of the correctness of the user's selection may be provided.

According to another embodiment in accordance with the invention, a "Warm Up!" exercise may be a multiple-choice quiz, which may be content-aware and change format based on the values received. The multiple choice quiz presentation module may display and play various combinations of text, image, and sound to construct the quiz based on the lesson content.

In another embodiment in accordance with the invention, a "Warm Up!" may be a sorting exercise, in which word categories and word entries may be received by the sorting content presentation module, which may then display the word categories and entries in randomly placed boxes. The user may drag each of the word entries to the proper graphic loaded for that word category. Again, the randomization of the draggable boxes may make the activity different with each play.

Lesson 217, "You Can Do It!" may provide an interactive screen displaying images. The user may be prompted to select the image that may best match an audio snippet that plays while the images on the screen. A visual and/or audio indication of the correctness of the user's selection may be provided. The images on the screen may be changed and/or scrambled prior to the next audio snippet is played.

Each of lessons 210-217 may provide an interactive screen and/or audio snippet that may provide an educational activity to a user using an approach that reinforces the language lessons for the unit in a pleasant, entertaining manner.

The speech recognition system may compare the user's utterance to a database of native language speakers for a baseline, or may make the comparison to a baseline of non-native language speakers having a similar background to the user's own demographics. Each baseline may contain pronunciation features common to the group forming the baseline so that a user may be provided with prompt or substantially immediate feedback based on the comparison that may allow the user to develop a homogeneous, accepted pronunciation by repetition. In some embodiments of the invention, a parent, teacher, or other authorized user, may be provided with the ability to remotely monitor or obtain access to pronunciation attempts by the user. Thus, for example, a teacher logged in to the system may be provided with the audio files of the student's pronunciation substantially in real-time, and may provide manual feedback on the pronunciation. For example, the teacher may type or speak comments to the student user relating to the transmitted pronunciation.

The system may further provide one or more reports to a user, a user's parent, an administrator or instructor of a group of users, etc. A report may provide statistical tools of comparison of the detected pronunciation of an individual user or group of users as compared against other users, e.g., other users having similar native language, geographic region, age, gender, etc. For example, a teacher may obtain a pronunciation assessment report of a student user having a certain native language. The report may compare the student's pronunciation of certain measured consonants, vowels, diphthongs, etc. as against a benchmark, e.g., against pronunciation by students of similar age and native language of each of the measured consonants, vowels, diphthongs, etc. Alternatively or additionally, a report may track progress of a user's pronunciation over time using audio samples captured over a period of time.

In an embodiment of the invention, a group of users may be associated, for example, as a class. The system may collect pronunciation samples from each student and prepare a report for the teacher of the class of common or individual problems that students may be having with pronunciation. The report may be in graph format, for example, a histogram showing the incidence of certain problems in the number of students in the class.

Based on the speech pronunciation analysis of a user's utterances, the speech recognition system may suggest to the user or other person associated therewith (e.g., teacher, parent, etc.) one or more pronunciation exercises customized to emphasize certain pronunciation problems, e.g., problems of the particular user and/or problems of other users having similar demographic background, e.g., native language, geographic location, age, gender, etc. Thus, for example, if the system detects that the user mis-pronounces the long pronunciation of the vowel "a", the user may be provided with pronunciation exercises of words having the long vowel "a", in order to encourage practice of the particularly problematic pronunciation. It will be understood therefore, that in a class of students, each having different native languages, the system may provide each user, based on his/her detected pronunciation and/or demographic, with customized pronunciation exercises, as well as reports to a teacher for keeping track of progress of the students.

Some embodiments of the invention may provide visual feedback and/or instruction to assist in improving pronunciation. For example, the system may associate certain utterances with lip motions. Upon detection of an utterance, the system may provide a visual simulation or representation of a mouth making the detected utterance. Moreover, in order to provide instruction, the system may further associate a correct or acceptable pronunciation with visual simulation or representation of a mouth making the correct or acceptable utterance. Thus, upon detection of an incorrect or mispronounced utterance, the system may generate and provide visual assistance by rendering a virtual mouth making the correct pronunciation of the mispronounced utterance. In some embodiments, the mispronounced (actual) and correctly pronounced (ideal) virtual mouths may be shown simultaneously, e.g., side-by-side, in order to demonstrate the contrast between incorrect and correct pronunciations of the word.

Content for each of the interactive flashcards, audio files, video images, pictures etc. may be stored in data store 160 that is in communication with server 110. Data store 160 may be a database with records organized and/or cross-referenced by language, grammatical form, sentence structure, definition, syntax, etc. Each record may be provided to any level, unit, and/or unit by system 100 to create the lesson being taught.

According to embodiments of the invention, each of the features may be associated with a content player or presentation module, which may be a generic software module or a uniform template, which may be used dynamically to present different content. According to embodiments of the invention, the presentation module may present different content by being provided with variables, audio content, video content, and graphic content, from a content management system (CMS).

According to embodiments of the invention, there may be provided one or more presentation modules for presenting the games or features that may be used repeatedly throughout the site. The presentation modules may be generic for their type, and may utilize different or dynamic data to change the content presented by each presentation module. Each of the presentation modules may parse values from the variables they receive, load the assets provided, and then initialize the activity based on the content received. According to embodiments of the invention, content presentation modules may be built in Adobe Flash, and coded in Actionscript, or any other suitable format.

According to embodiments of the invention, various games may be provided based on the relevant educational content. For example, there may be provided a board game in which users roll dice (e.g., by clicking on a dice icon and receiving randomly generated numbers), and move around a playing field board presented on the screen, answering questions and competing against a computer opponent.

According to embodiments of the invention, all categories, questions, and answers may be built dynamically with external variables, and the graphics for the board and pieces may furthermore be set dynamically. Accordingly, a single board game content presentation module may be used as a template to provide a plurality of lessons, depending on the content provided to the presentation module. It will be recognized that the lesson displayed on the upper part of the screen may determine the content provided to the content presentation module.

Another game module may be a Catch It game, in which a pool of visual content (loaded graphics or text) may scroll from one edge of the screen, e.g., the top, to another, e.g., the bottom, in a randomized manner. Text and audio prompts may indicate which item the student must select next. Randomization may provide a unique order for the falling content each time the game is played. Again, the lesson selected may provide the content to be presented in the game.

In yet another game module according to an embodiment of the invention, users may maneuver a character across a board on which some squares present questions, traps or prizes. All of the content for these squares may be loaded dynamically, and the layout of the squares may be randomized so that the location of positive and negative squares may change with each play.

Web pages may include some general features independent of the particular level, unit, or lesson displayed, for example, "Word Lists", "Teaching Tools", and "Help".

FIG. 5 is an exemplary screenshot of a Word List feature according to an embodiment of the invention. According to embodiments of the invention, the Word Lists module may receive a dynamic list of words, for example, from the CMS, and may based thereon display all vocabulary or other educational content used in the site, or in any relevant subsection thereof. Each item in the list may be paired with multimedia content. For example, words may be paired with audio, video, or graphic content, which may load dynamically with each word clicked. The words may be arranged programmatically, for example, selectively in a per-lesson listing and/or in an alphabetical listing.

The above-described activities reinforce the lessons for the unit in a manner that is conducive to user participation and learning. Other units and lessons may use these and other activities to achieve the instructional goal.

Figure 6:
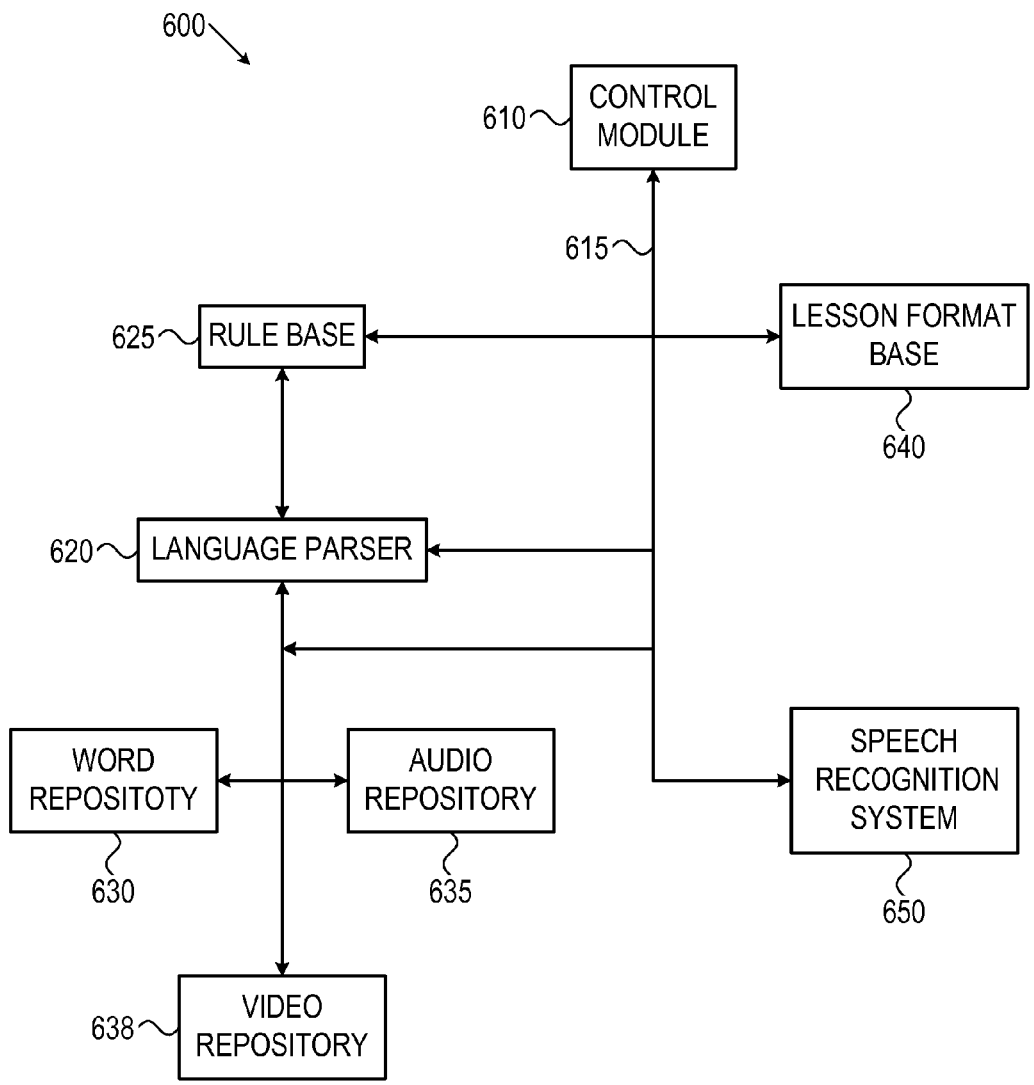
FIG. 6 illustrates a schematic diagram of a modular platform in accordance with an embodiment of the invention.

FIG. 6 illustrates a schematic diagram of modular platform 600 in accordance with an embodiment of the invention. In one embodiment, modular platform 600 may have portions located at server 110 and a computing device operated by users A, B, and C configured as a client device on system 100. In another embodiment in accordance with the invention, modular platform 600 may be a stand-alone application resident on the computing device operated by users A, B, and C.

Modular platform 600 may include a control module 610 that may control the operation of the modular platform. Control module 610 communicates control and data signals via bus 615. Modular platform also includes language parser 620 that may access word repository 630, audio repository 635, and video repository 638 to use the content stored therein for each of the interactive flashcards, audio files, video images, pictures etc. In an embodiment of the invention, word repository 630, audio repository 635, and video repository 638 may be located within data store 160.

Language parser 620 may take content from word repository 630, audio repository 635, and/or video repository 638 to assemble the content for the hyperlink layers of GUI 200. The nature of the content accessed by language parser 620 may vary dependent on the nature of the GUI hyperlink layer undergoing assembly. For example, every language has a syntax and format (e.g., a noun identifies a person, place or thing; a verb describes an action, an adjective describes a noun, etc.). The language parser accesses the content based on a predetermined content. Language parser 620 may access word content based on an image to be displayed, or conversely may access the image to be displayed based on the word content. Similarly, the language parser may access an audio file based on the word or image, or vice a versa.

Associated with language parser 620 may be syntax rule base 625. Syntax rule base 625 may provide rules to the language parser for a particular language to create a proper structure (i.e., a written sentence, and/or an audible sentence)

by stringing together the individual components of the structure. For example, the sentence "This is a horse." includes a definite article, "this"; a verb "is"; an indefinite article "a", and a noun "horse." Syntax rule base 625 provides language specific syntax rules to language parser 620 to instruct the language parser how to put together the individual elements to create the sentence. In different languages, the noun may precede the verb, there may not be a definite article, and other rules may apply. Syntax rule base 625 may provide the particular rules for a particular language to the language parser.

A universal identifier (e.g., a numeric) may identify a record within word repository 630, audio repository 635, and video repository 638 where each respective word, image, and audio snippet may be located.

Language parser 620 may cross-reference the rules provided from syntax rule base 625 with the numeric identifier for the word, image, and/or audio snippet based on the language of interest to access the proper content to insert into the GUI layer based on the syntax provided by syntax rule base 625. The language parser may provide language specific content to control module 610 for display in a GUI on the user's computing device.

Modular platform 600 may include lesson format base 640 that contains the various types of lesson module styles described above. For example, lesson format base 640 may contain the sorting content presentation module, a multiple choice quiz presentation module, a complete and match warm-up module, a board game presentation module, etc. Information from lesson format base 640 may be provided to the language parser so that it may know the content of the GUI layer being assembled.

Modular platform 600 may include speech recognition system 650, which may evaluate the pronunciation and sentence structure skills of the user. Speech recognition system 650 may include a microphone that receives the utterance of a user. The utterance of the user may then undergo signal analysis so that it can be partitioned into frames for analysis. The frames may be acoustically analyzed to evaluate the user's pronunciation. The frames or a sequence of frames may also be converted to text to evaluate the sentence structure spoken by the user.

The acoustic analysis may be performed by comparing on or more frames to acoustic models that may be stored in data store 160. Based on the results of the acoustic comparison, an acoustic score may be provided that reflects the skill level of the user. The acoustic models may be a word, a series of words, and/or a complete sentence based on the acoustic patterns spoken by native language speakers. The acoustic models may also be a word, a series of words, and/or a complete sentence based on the acoustic patterns spoken by persons having the same native-language as the user. The latter model allows for evaluating the user's skill in a non-native language while making allowance for verbal speech patterns inherent from the user's native language.

The structural analysis of the text sequence may be performed by comparing the text sequence to syntax models that may be stored in data store 160. Based on the results of the structural comparison, a structural score may be provided that reflects the skill level of the user. The acoustic score and the structural score may be stored in data store 160 so that a user's progress over time may be evaluated.

In this manner, modular platform 600 may build a generic structure for each of GUI 200 hyperlink layers that may be capable of population by language parser 620 with different words, images, audio content, etc. based on the language being taught and/or the lesson being assembled.

Figure 7:
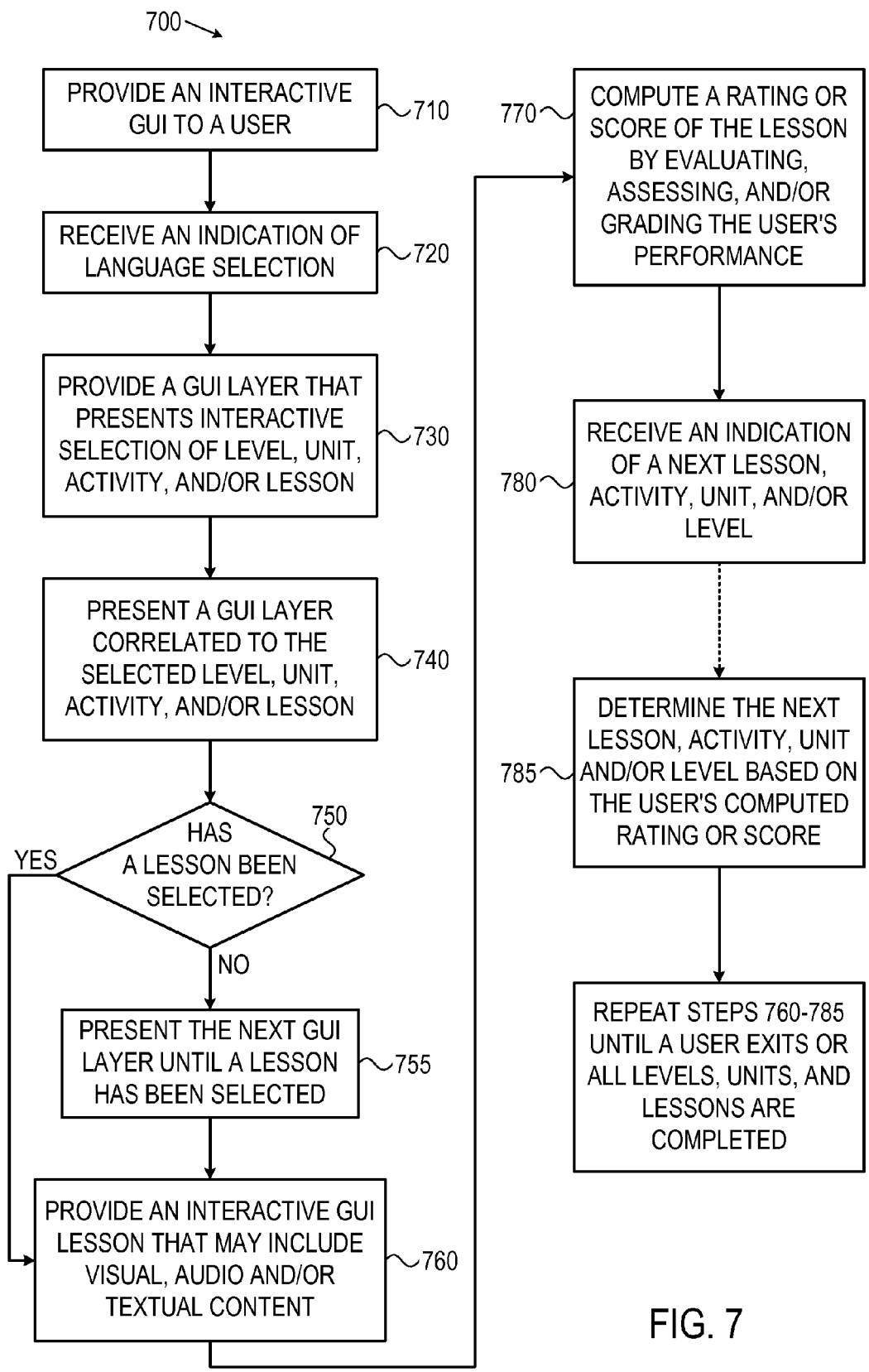
FIG. 7 illustrates a process in accordance with an embodiment of the invention.

FIG. 7 illustrates process 700 for providing a computer-based, modular platform to deliver educational content to a user in accordance with an embodiment of the invention. Process 700 provides an interactive GUI to a user, step 710. A server connected to a user's computing device across a communication network may provide the interactive GUI. In accordance with another embodiment of the invention, the interactive GUI may be provided by an application local to a stand-alone computing device.

An indication of the educational content may be received, step 720, at the modular platform. In one embodiment, the indication of educational content may be a language being studied by the user. The selected language may be received from the GUI based on a user's selection. In accordance with an embodiment of the invention, process 700 may recall a user's prior history and continue with the same language.

At step 730, process 700 may present a user with a GUI layer that provides selection of level, unit, and/or lesson. Process 700 may recall a user's prior history and present the next level, unit, activity, and/or lesson. A user may select a different level, unit, and/or lesson from either GUI screen.

Process 700 may present a GUI layer, step 740, correlated to the user's selection. For example, if the user selected a level, the current GUI layer may offer the user a choice of levels. If the user selected a unit within a level, the current GUI layer may offer the user a choice of lessons for the unit. If the user selected a lesson, step 750, process 700 may skip to step 760.

At step 755, process 700 may enter a loop to receive an indication of a lesson from the user. The loop may present one or more GUI layers, where each layer flows from a selection received from the prior GUI layer. Upon receiving a lesson selection, process 700 exits the loop and may continue at step 760.

Process 700, at step 760 may provide the user with an interactive GUI lesson that may include visual, audio, and/or textual content. The visual, audio, and/or textual content may be for the lessons described above, or for other interactive lessons.

After completion of the lesson, process 700 may evaluate, assess, and/or grade, step 770, the user's performance and compute a rating and/or score. The evaluation, assessment, and/or grading results may be stored in data store 160 so that a user's progress over time may be calculated.

After completion of a lesson, process 700 may receive an indication, step 780, of the next lesson, unit, and/or level selected by a user. In one embodiment, process 700 may determine, step 785, the next lesson, unit, and/or level for the user based on the short-term evaluation, assessment, and/or grading results or based on the user's long term computed progress.

Process 700 then may repeat steps 760-785 until a user exits the process, or all levels, units, and lessons are completed.

Figure 8:
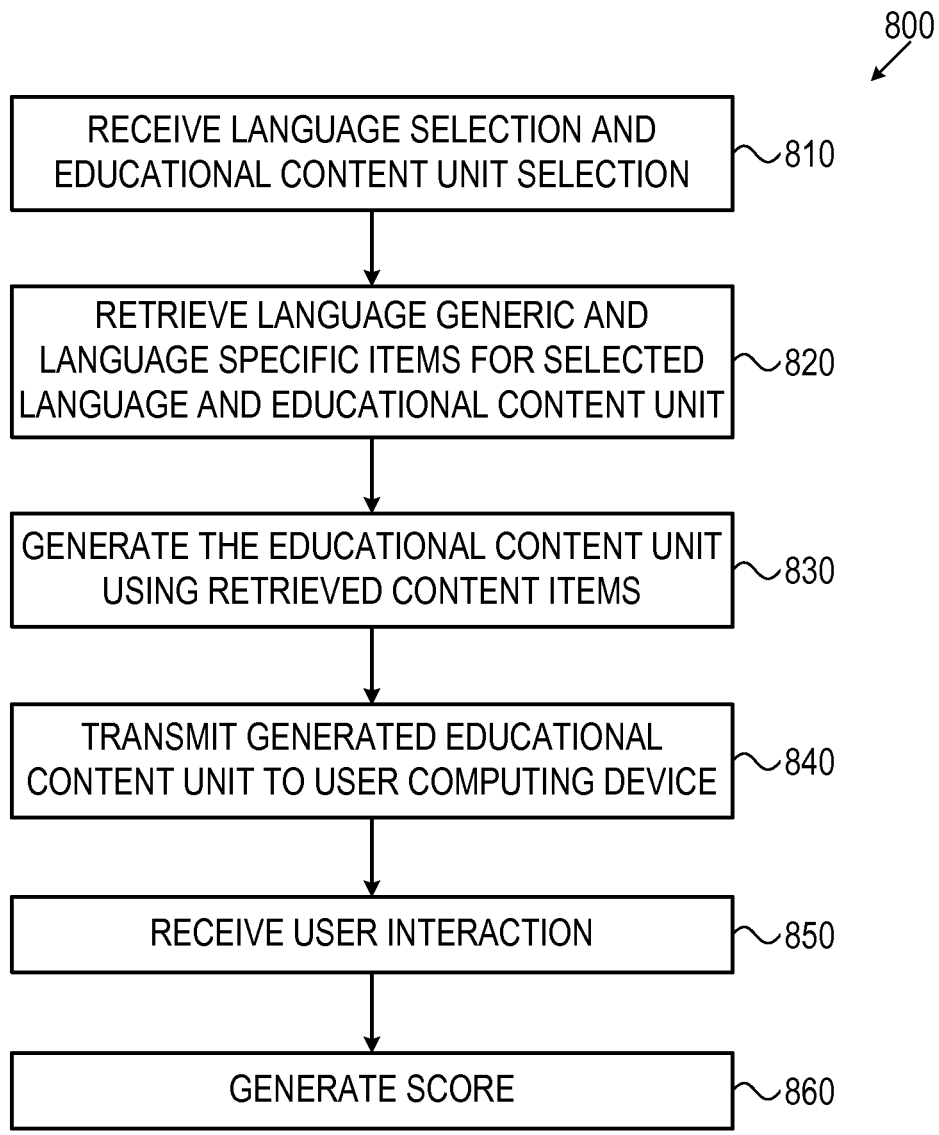
FIG. 8 illustrates a process in accordance with an embodiment of the invention.

FIG. 8 illustrates a process 800 in accordance with an embodiment of the invention for providing educational content pertaining to any of a plurality of languages over a network.

At stage 810, a language selection or indication indicating a language selected to be studied by the user and an educational content unit selection are obtained. Either or both of these may be obtained from a user record, for example, after a user signs in to the system, or the selection may be made by the user over the network. It will be understood that the educational content unit may be any of the above educational modules, e.g., a teaching unit, a game, an exercise, etc.

At stage 820, certain content items required to present the educational content unit in the selected language are retrieved. In one embodiment of the invention, the content items may be obtained from a content database. The content database may include a plurality of content records, each content record associated with at least one educational content unit and including at least one language-generic content item and a plurality of language-specific content items, each of the language-specific content items pertaining to a respectively different language. For example, a content record may be for the word "horse", which may be used in connection with one or more educational content units. The content record for "horse" may include at least one language-generic content item, for example, a picture of a horse, a part of speech, e.g., noun, a category, e.g., animal. The content record for "horse" may further include a plurality of language-specific content items, for example, a plurality of texts of the word "horse" in the respective languages, a plurality of audio files of the pronunciation of the word "horse" in the respective languages, etc. Thus, if the selected language is French, and a selected educational content unit calls for the word "horse", then the process may retrieve at least one language-generic content item, e.g., a picture of a horse, and at least one French language-specific content item, e.g., the text "cheval".

At stage 830, the educational content unit may be generated using the retrieved language-general and language-specific content item. For example, there may be provided in an educational content unit template repository including templates for each available educational content unit. The templates may include placeholders for the language-specific content items to be inserted at the time of generation. In some embodiments, the template may include language-generic content items, or placeholders for language-generic content items.

At stage 840, the generated educational content unit may be transmitted over the network for display on the computing device. In some embodiments of the invention, e.g., a lesson without user input, the method may end with stage 840.

Some embodiments of the invention, for example, where input or other interaction is requested from the user, may include stage 850, in which user interaction may be received from the user computing device. At stage 860, the input or interaction may be analyzed to obtain a score. In some embodiments of the invention, the interaction may be a vocal input by a user, and the process may involve the processing as described above to improve pronunciation.

While there have been shown and described fundamental novel features of the invention as applied to several embodiments, it will be understood that those skilled in the art may make various omissions, substitutions, and changes in the form, detail, and operation of the illustrated embodiments without departing from the spirit and scope of the invention. Substitutions of elements from one embodiment to another are also fully intended and contemplated. The invention is defined solely with regard to the claims appended hereto, and equivalents of the recitations therein.

We claim:

1. A system for providing a graphical user interface (GUI) based modular platform, comprising:

a control module coupled to a bus, and configured to receive and provide data and control signals;

a language parser coupled to the bus;

a syntax rule base coupled to the bus and associated with the language parser, the syntax rule base configured to provide language specific rules of a particular language to the language parser, the rules provided to instruct the language parser how to put together individual elements to create a sentence in the particular language;

a lesson format base coupled to the bus, the lesson format base comprising a plurality of lesson module styles and configured to provide a selected lesson module style to the language parser;

a presentation module for presenting the GUI to a user; and a speech recognition system coupled to the bus and configured to receive an utterance from the user, wherein the utterance is evaluated with regard to pronunciation accuracy and sentence structure accuracy, wherein the language parser is configured to access, based on the at least one lesson module style and on the language specific rules provided by the syntax rule base, content pertaining to a plurality of languages within repositories, to create sentences by stringing together individual components of the content, and to provide language specific content including the sentences to the control module, wherein the control module to send the language specific content to the presentation module for presentation in the GUI, wherein the utterance is received in response to the presented language specific content, wherein the speech recognition system is configured to perform an audio analysis using acoustic models to evaluate the pronunciation accuracy, wherein the acoustic models are based on at least one of native language speakers and non-native language speakers having the same language demographic as a user, and wherein the speech recognition system is configured to perform a structural analysis using syntax models to evaluate the sentence structure accuracy.

2. The system of claim 1, wherein the repositories are at least one of a word repository, an audio repository, and a textual repository.

3. The system of claim 1, wherein the language parser is configured to access at least one of word content, audio content, and video content based on at least one of word, audio file, and image.

4. The system of claim 1, wherein the language parser is configured to cross-reference the language specific rules with at least one universal identifier to access the repositories' content.

5. The system of claim 1, wherein the control module is configured to merge the language specific content and the lesson styles to create GUI hyperlink layers for display at a user's computing device.

6. The system of claim 1, wherein each GUI is a generic GUI structure that is populated by the control module based on input from the language parser and the lesson format base.

* * * * *